United States Patent
Alpert et al.

(10) Patent No.: US 10,057,747 B2
(45) Date of Patent: Aug. 21, 2018

(54) 5G MB CONNECTIVITY ACKNOWLEDGEMENT AGGREGATION

(71) Applicant: INTEL CORPORATION, Santa Clara, CA (US)

(72) Inventors: Yaron Alpert, Petah Tikva (IL); Laurent Cariou, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/390,964

(22) Filed: Dec. 27, 2016

(65) Prior Publication Data

US 2018/0184233 A1  Jun. 28, 2018

(51) Int. Cl.
| | | |
|---|---|---|
| *H04W 4/00* | (2018.01) | |
| *H04W 4/80* | (2018.01) | |
| *H04W 4/70* | (2018.01) | |
| *H04W 84/12* | (2009.01) | |
| *H04W 88/08* | (2009.01) | |
| *H04W 84/04* | (2009.01) | |

(52) U.S. Cl.
CPC ............. *H04W 4/80* (2018.02); *H04W 4/005* (2013.01); *H04W 4/008* (2013.01); *H04W 4/70* (2018.02); *H04W 84/042* (2013.01); *H04W 84/12* (2013.01); *H04W 88/08* (2013.01)

(58) Field of Classification Search
CPC ... H04W 28/04; H04W 72/04; H04W 72/042; H04W 88/08; H04W 88/06; H04W 80/04; H04W 84/18; H04W 84/12; H04W 4/02; H04W 88/02; H04W 84/00
USPC ........... 455/418, 422.1, 550.1; 370/328, 329, 370/338
See application file for complete search history.

(56) References Cited

U.S. PATENT DOCUMENTS

| | | | | |
|---|---|---|---|---|
| 2013/0022089 A1* | 1/2013 | Min | ...................... | H04L 1/0001 375/219 |
| 2014/0254349 A1* | 9/2014 | Jia | ......................... | H04W 28/04 370/225 |
| 2015/0156671 A1* | 6/2015 | Kuchibhotla | ......... | H04L 1/1861 370/330 |
| 2016/0029389 A1* | 1/2016 | Merlin | ...................... | H04J 1/14 370/330 |
| 2017/0111951 A1* | 4/2017 | Chu | .................... | H04W 76/025 |

* cited by examiner

*Primary Examiner* — Nhan Le
(74) *Attorney, Agent, or Firm* — Jason H. Vick; Sheridan Ross, PC

(57) ABSTRACT

Wireless devices and methods presented in the disclosure provide for block acknowledgements for multi-band transmissions. The block acknowledgements can be coupled (aggregated) for two or more flows across multiple bands by using an acknowledge aggregation methodology. The method creates a single multi-band common acknowledgment that can be sent over one band to acknowledge transmissions over two or more bands.

20 Claims, 9 Drawing Sheets

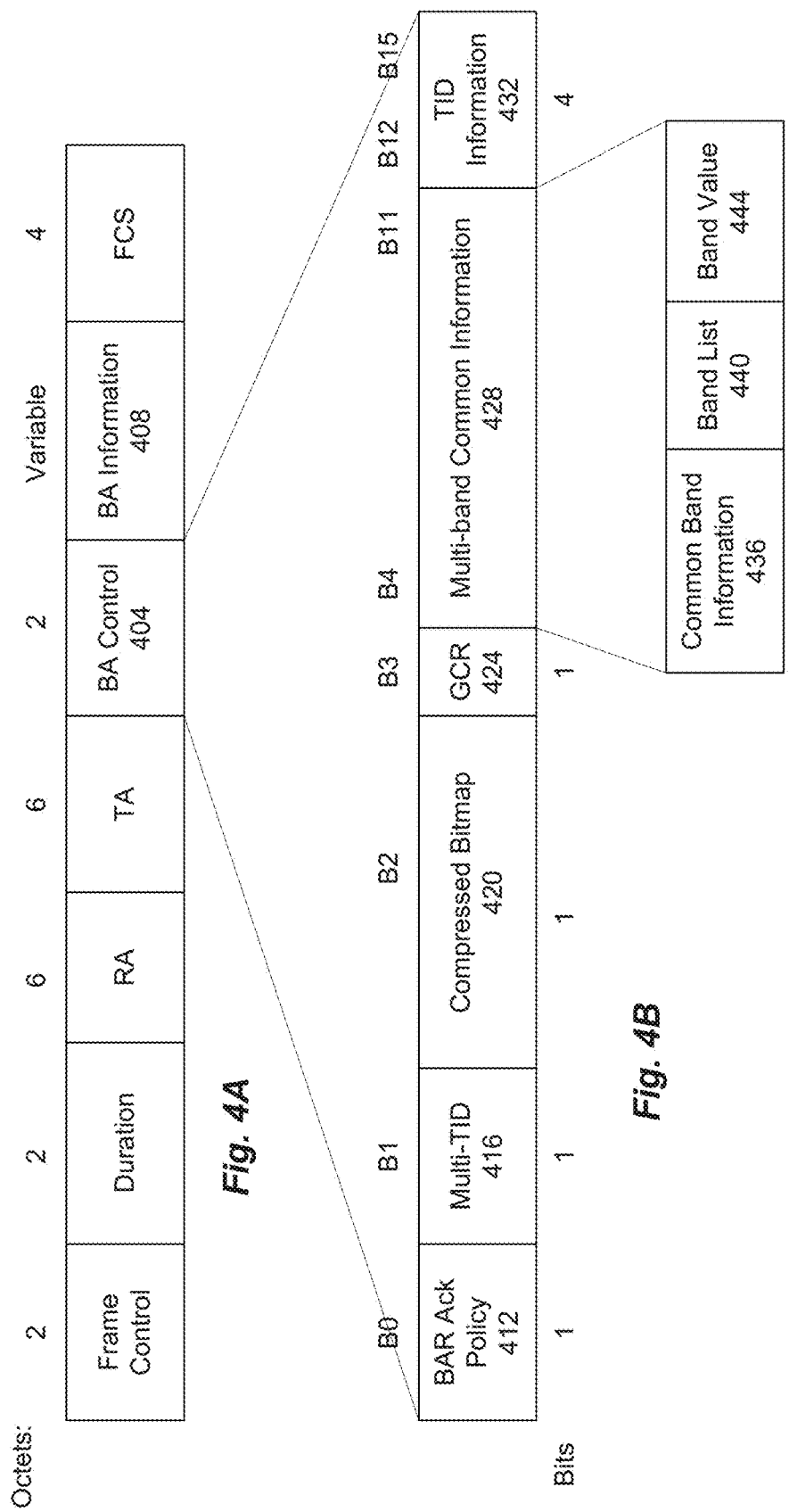

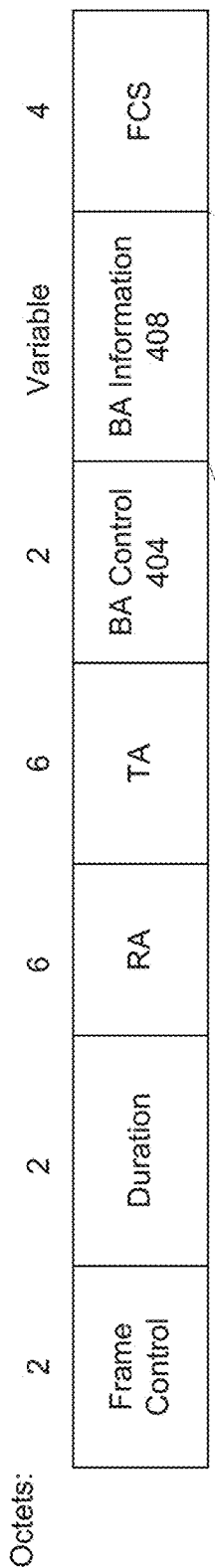
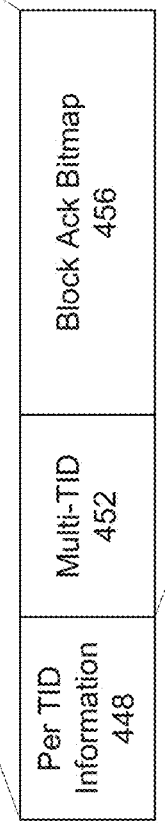
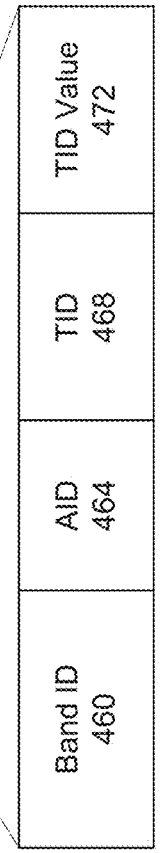
Fig. 4A
Fig. 4D
Fig. 4E

500

| Element ID | Length | ADDBA Capabilities 504 |

| Common Band Information 508 | Band List 512 | BA Method 516 | BA Characteristics 520 | STA Characteristics 524 | Priorities 528 | Context Switching 532 |

*Fig. 5B*

| BA Format 536 | Multi-TID List 540 | Simultaneous Bands 544 | Aggregation Limit 548 | Delay Limit 552 | BA Policy 556 |

5G MB CONNECTIVITY ACKNOWLEDGEMENT AGGREGATION

TECHNICAL FIELD

An exemplary aspect is directed toward communications systems. More specifically an exemplary aspect is directed toward wireless communications systems and even more specifically to IEEE (Institute of Electrical and Electronics Engineers) 802.11 wireless communications systems. Even more specifically, exemplary aspects are at least directed toward one or more of IEEE (Institute of Electrical and Electronics Engineers) 802.11n/ac/ad/ah/ax/ay communications systems and in general any wireless communications system or protocol, such as 4G, 4G LTE, 5G and later, and the like.

BACKGROUND

Wireless networks transmit and receive information utilizing varying techniques and protocols. For example, but not by way of limitation, two common and widely adopted techniques used for communication are those that adhere to the Institute for Electronic and Electrical Engineers (IEEE) 802.11 standards such as the IEEE 802.11n standard, the IEEE 802.11ac standard, the IEEE 802.11ad standard, the IEEE 802.11ah standard, the IEEE 802.11ay standard and the IEEE 802.11ax standard, other current IEEE 802.11 standards.

The IEEE 802.11 standards specify a common Medium Access Control (MAC) Layer which provides a variety of functions that support the operation of IEEE 802.11-based Wireless LANs (WLANs) and devices. The MAC Layer manages and maintains communications between IEEE 802.11 stations (such as between radio network interface cards (NIC) in a PC or other wireless device(s) or stations (STA) and access points (APs)) by coordinating access to a shared radio channel and utilizing protocols that enhance communications over a wireless medium.

Based on 5G studies and objectives, multiple air interfaces will be needed to fulfill the mobile data capacity requirements in the upcoming years. The Third Generation Partnership Project (3GPP) is planning on defining multiple air interfaces for 5G (for the Internet-of-Things (IoT) interface, post-LTE sub-6 GHz interface, communications, and/or millimeter-wave interface) and on integrating existing 3G and/or 4G interfaces (or spectrum) and Wi-Fi interfaces (or spectrum).

One of the proposed solutions for 5G is multi-band connectivity and/or link aggregation that enables multi-connection and multi-transmission over different bands. Different bands have different air interfaces, operation technology, range/coverage, load, and capacity. Thus, there is a need to optimize the protocol to support and optimize any new multi-band connectivity. Specifically, multi-band operation is suffering from a lack of flexibility for sending control information. This problem is particularly acute for sending acknowledgements because the acknowledgements currently need to be sent on the same air interface as the related data.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4A illustrates an embodiment of a control frame for conducting block acknowledgements for multi-band transmissions;

FIG. 4B illustrates an embodiment of a control frame for conducting block acknowledgements for multi-band transmissions;

FIG. 4C illustrates an embodiment of a control frame for conducting block acknowledgements for multi-band transmissions;

FIG. 4D illustrates an embodiment of a control frame for conducting block acknowledgements for multi-band transmissions;

FIG. 4E illustrates an embodiment of a control frame for conducting block acknowledgements for multi-band transmissions;

FIG. 5A illustrates an embodiment of a control frame for indicating the ability to conduct block acknowledgements for multi-band transmissions;

FIG. 5B illustrates an embodiment of a control frame for indicating the ability to conduct block acknowledgements for multi-band transmissions;

FIG. 5C illustrates an embodiment of a control frame for indicating the ability to conduct block acknowledgements for multi-band transmissions;

DESCRIPTION OF EMBODIMENTS

Figure 1:
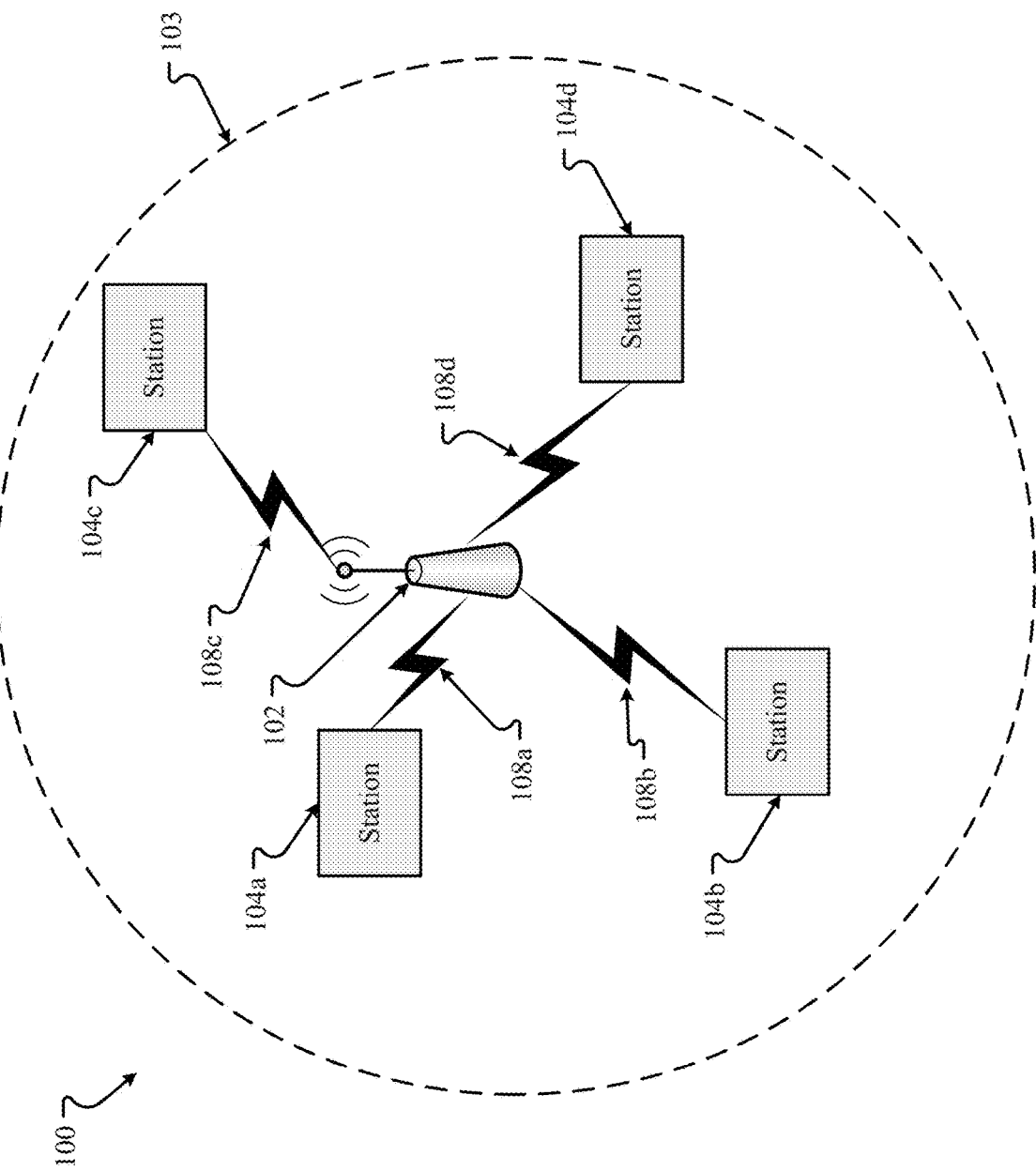
FIG. 1 illustrates an embodiment of an environment for conducting block acknowledgements for multi-band transmissions.

The embodiments presented herein provide for block acknowledgements aggregation for multi-band transmissions. The acknowledgements can be coupled (aggregated) for two or more flows across multiple bands by using an acknowledge aggregation methodology. The method address a multi-band common acknowledgment aggregation establishment method and acknowledge aggregation flow control.

The common acknowledgment aggregation element is added to the control information that can acknowledge multiple flows (for example traffic identifier (TID)) received from multiple bands when the system implements MAC level multi-band link acknowledgment aggregation. The aggregation principle is based on decoupling the acknowledgment and data plane: acknowledgment aggregation can be done in one band, while data can be sent in another band and/or a common acknowledgment aggregation can be done for all operating bands at one of the selected band.

The multi-band acknowledgment aggregation method can be transmitted in the "most reliable" band (the term "most reliable" refers to the band that has the highest probability for acknowledgment miss detection and/or the less loaded (i.e., a low chance for collision and/or better decoding probably (low error). The new multi-band acknowledgment aggregation method can also be used to reduce the delays since retransmitted frame acknowledgment can be sent in the "most reliable" band and/or send acknowledgment in parallel to receiving the remaining PPDUs. This new multi-band acknowledgment aggregation method can also be used for soft handover/band steering and smooth context switching between the two bands, since these operations can be performed transparently from the control plane, which stays the same. Note that the Multi-band connection and acknowledgment can be done between one or more technologies (for example Wi-Fi and BlueTooth™, Wi-Fi and Long-Term Evolution (LTE), etc.)

Some embodiments may involve wireless communications according to one or more other wireless communication standards. Examples of other wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11 ah, IEEE 802.11ay and/or other current or future IEEE 802.11 standards, Wi-Fi Alliance (WFA) wireless communication standards, such as, Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above.

Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

FIG. 1 illustrates an example of an operating environment 100 which may be representative of various configurations described herein. The WLAN 103 may comprise a basic service set (BSS) that may include a master station 102 and one or more other stations (STAs) 104. The master station 102 may be an access point (AP) using the IEEE 802.11 to transmit and receive. Hereinafter, the term AP will be used to identify the master station 102. The AP 102 may be a base station and may use other communications protocols as well as the IEEE 802.11 protocol. The IEEE 802.11 protocol may be the IEEE 802.11ax or later standard. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The STAs 104 may include one or more high-efficiency wireless (HEW) (as illustrated in, e.g., the IEEE 802.11ax standard) STAs 104 a, b, d and/or one or more legacy (as illustrated in, e.g., the IEEE 802.11n/ac standards) STAs 104c. The legacy STAs 104c may operate in accordance with one or more of IEEE 802.11 a/b/g/n/ac/ad/af/ah/aj/ay, or another wireless communication standard. The HEW STAs 104 a, b, d may be wireless transmit and receive devices, for example, a cellular telephone, a smart telephone, a handheld wireless device, wireless glasses, a wireless watch, a wireless personal device, a tablet, or another device that may be transmitting and receiving using a IEEE 802.11 protocol, for example, the IEEE 802.11ax or another wireless protocol. In the operating environment 100, an AP 102 may generally manage access to the wireless medium in the WLAN 103.

Within the environment 100, one or more STAs 104a, 104b, 104c, 104d may associate and/or communication with the AP 102 to join the WLAN 103. Joining the WLAN 103 may enable STAs 104a-104d to wirelessly communicate with each other via the AP 102, with each other directly, with the AP 102, or to another network or resource through the AP 102. In some configurations, to send data to a recipient (e.g., STA 104a), a sending STA (e.g., STA 104b) may transmit an uplink (UL) physical layer convergence procedure (PLCP) protocol data unit (PPDU) comprising the data to AP 102, which may then send the data to the recipient STA 104a, in a downlink (DL) PPDU.

In some configurations, a frame of data transmitted between the STAs 104 or between a STA 104 and the AP 102 may be configurable. For example, a channel used in for communication may be divided into subchannels that may be 20 MHz, 40 MHz, or 80 MHz, 160 MHz, 320 MHz of contiguous bandwidth or an 80+80 MHz (160 MHz) of non-contiguous bandwidth. Further, the bandwidth of a subchannel may be incremented into 1 MHz, 1.25 MHz, 2.03 MHz, 2.5 MHz, 5 MHz and 10 MHz bandwidths, or a combination thereof, or another bandwidth division that is less or equal to the available bandwidth may also be used. The bandwidth of the subchannels may be based on a number of active subcarriers. The bandwidth of the subchannels can be multiples of 26 (e.g., 26, 52, 104, etc.) active subcarriers or tones that are spaced by 20 MHz. In some configurations, the bandwidth of the subchannels is 256 tones spaced by 20 MHz. In other configurations, the subchannels are a multiple of 26 tones or a multiple of 20 MHz. A 20 MHz subchannel may also comprise 256 tones for use with a 256 point Fast Fourier Transform (FFT).

At a given point in time, multiple STAs 104a-d, in the WLAN 103, may wish to send data. In some configurations, rather than scheduling medium access for STAs 104a-d in different respective UL time intervals, the AP 102 may schedule medium access for STAs 104a-d to support UL multi-user (MU) transmission techniques, according to which multiple STAs 104a-d may transmit UL MU PPDUs to the AP 102 simultaneously during a given UL time interval. For example, by using UL MU OFDMA techniques during a given UL time interval, multiple STAs 104a-d may transmit UL MU PPDUs to AP 102 via different respective OFDMA resource units (RUs) allocated by AP 102. In another example, by using UL MU multiple-input multiple-output (MU-MIMO) techniques during a given UL time interval, multiple STAs 104a-d may transmit UL MU PPDUs to the AP 102 via different respective spatial streams allocated by the AP 102.

To manage access, the AP 102 may transmit a HEW master-sync transmission, which may be a trigger frame (TF) or a control and schedule transmission, at the beginning of the control period. The AP 102 may transmit a time duration of the TXOP and sub-channel information. During the HEW control period, HEW STAs 104 a, b, d may communicate with the AP 102 in accordance with a non-contention based multiple access technique such as OFDMA, MU-MIMO, etc., or combination thereof. This HEW technique is unlike conventional WLAN communications in which devices communicate in accordance with a contention-based communication technique, rather than a multiple access technique. During the HEW control period, the AP 102 may communicate with stations 104 using one or more control frames, and the STAs 104 may operate on a sub-channel smaller than the operating range of the AP 102. Also, during the control period, legacy stations may refrain from communicating by entering a deferral period.

During the HEW master-sync transmission, the STAs 104 may contend for the wireless medium with the legacy devices 106 being excluded from contending for the wireless medium during the HEW master-sync transmission. The trigger frame used during this HEW master-sync transmission may indicate an UL-MU-MIMO and/or UL OFDMA control period etc., and/or combination thereof. The multiple-access technique used during the control period may be a scheduled OFDMA technique, or alternatively, may be a TDMA technique, a frequency division multiple access (FDMA) technique, or a SDMA technique.

The AP 102 may also communicate with legacy stations and/or HEW stations 104 in accordance with legacy IEEE 802.11 communication techniques. In some configurations, the AP 102 may also be configurable to communicate with HEW stations 104 outside the HEW control period in accordance with legacy IEEE 802.11 communication techniques, although this is not a requirement.

Figure 2:
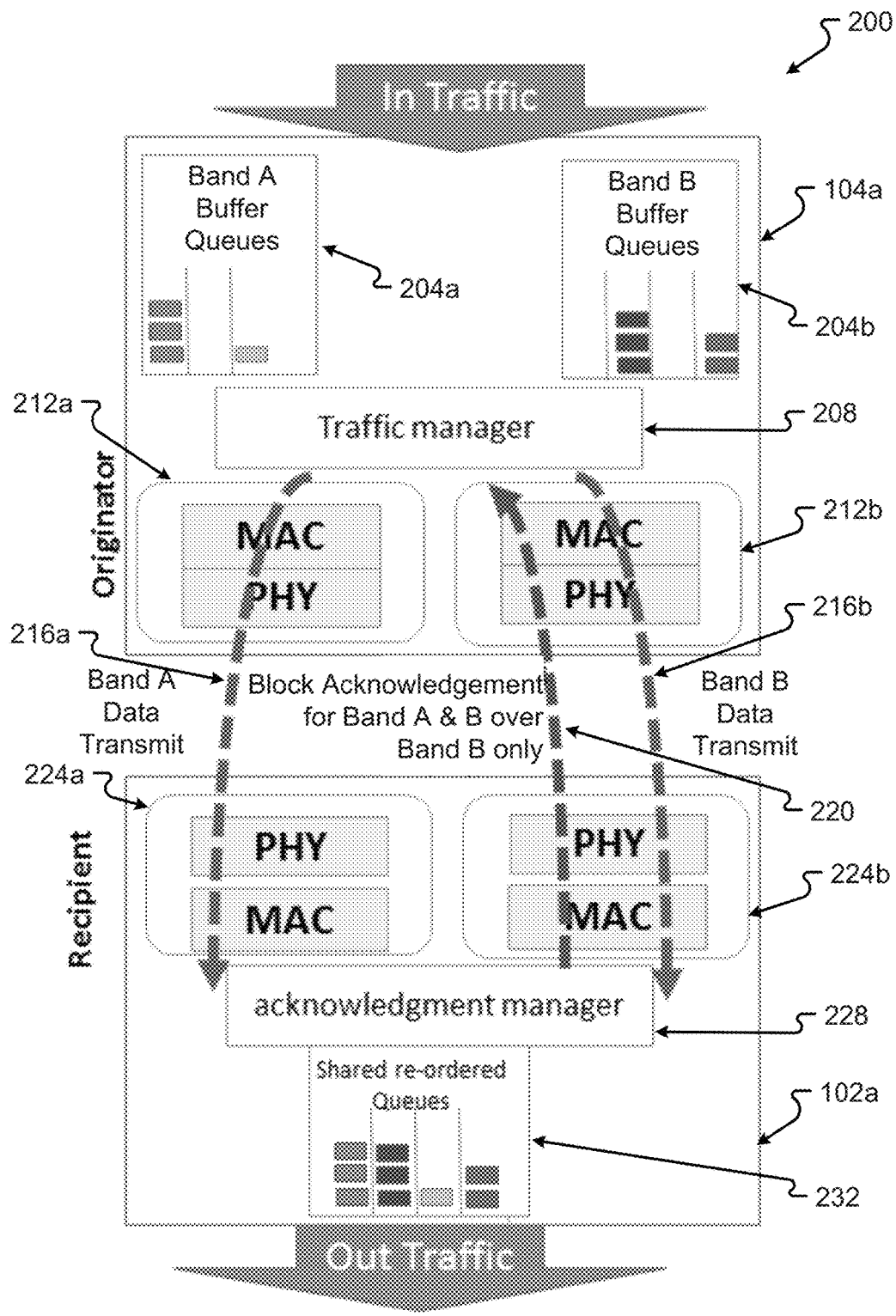
FIG. 2 illustrates another embodiment of an environment for conducting block acknowledgements for multi-band transmissions.

Herein, the exchange of multi-band transmissions will be described with reference to STA 104 and AP 102a. However, it is possible that any combination of STAs, whether STAs 104 or APs 102, can conduct the methods, signaling, etc. described herein. As shown in FIG. 2, a first STA 104a can communicate with a second STA 102a using a multi-band transmission 216a, 216b. Here, two or more flows 216 can be sent across multiple bands (e.g. band A 216a and band B 216b) by using an acknowledge aggregation methodology. The method address a multi-band common acknowledgment aggregation establishment method (multi-bands acknowledgment aggregation capability indication and capability negotiation), and common acknowledge aggregation flow control.

The embodiments propose to add a common acknowledgment aggregation element that can acknowledge multiple flows (for example, multiple TIDs) received when the system implements MAC level multi-band link acknowledgment aggregation. The aggregation principle is based on decoupling the acknowledgment and the data plane: acknowledgment aggregation can be done in one band, while data can be sent in at least one other band. The multi-band acknowledgment can be transmitted in the "most reliable" band (the term "most reliable" refers to the band that has the highest probability for acknowledgment miss detection and/or the less loaded, e.g., low chance for collision, bands). The new multi-band acknowledgment aggregation method can also be used to reduce the delays since retransmitted frame acknowledgment can be sent in the "most reliable" band. The new multi-band acknowledgment aggregation method can also be used for soft handover/band steering and smooth context switching between the two bands, since these procedures can be performed transparently from the control plane, which stays the same.

FIG. 2 shows the signalling 200 at a high level proposed wherein originator traffic manager 208 (executed in a controller 820) sends data packets simultaneously via more than one band (e.g. band A 216a or band B 216b), the acknowledgment aggregation manager 228, at the recipient STA 102a, can aggregate the acknowledgment aggregation response 220, from multiple bands (e.g. band A 216a and band B 216b), and can send the acknowledgment aggregation response 220 dynamically via one of the operating bands (e.g. band A 216a or band B 216b), then the traffic manager 208 can resend the failed (non ACKed) packet again (retransmission).

In the environment 200, the sending STA 104a can receive incoming data and buffer the data in buffer(s) 204a, 204b. A traffic manager 208 may buffer the data or buffering may be coordinated with another component. Using wireless radio hardware/software 212a (e.g., transmitter 864, MAC module 860, and/or PHY module 856, etc.), first buffered data 204 can be sent as signal 216a to the receiving STA 102a. Similarly, wireless radio 212b (e.g., transmitter 864, MAC module 860, and/or PHY module 856, etc.) can send second buffered data 204b over a second band transmission 216b to the receiving STA 102a.

The receiving STA 102a can receive the data 216a over the first band at a first receiving wireless radio 224a (e.g., transmitter 864, MAC module 860, and/or PHY module 856, etc.) and second data 216b at a second receiving wireless radio 224b (e.g., transmitter 864, MAC module 860, and/or PHY module 856, etc.). Since the data needs to be release within the arrival order, the acknowledgement manager 228 (executed in a controller 820) can aggregate the data 232 and form a block acknowledgement (BA) for all received data packets. The BA can be sent by one of the wireless radios 224 and over one of the bands (e.g. band A 216a or band B 216b) to the sending STA 104a, as signal 220.

Figure 3:
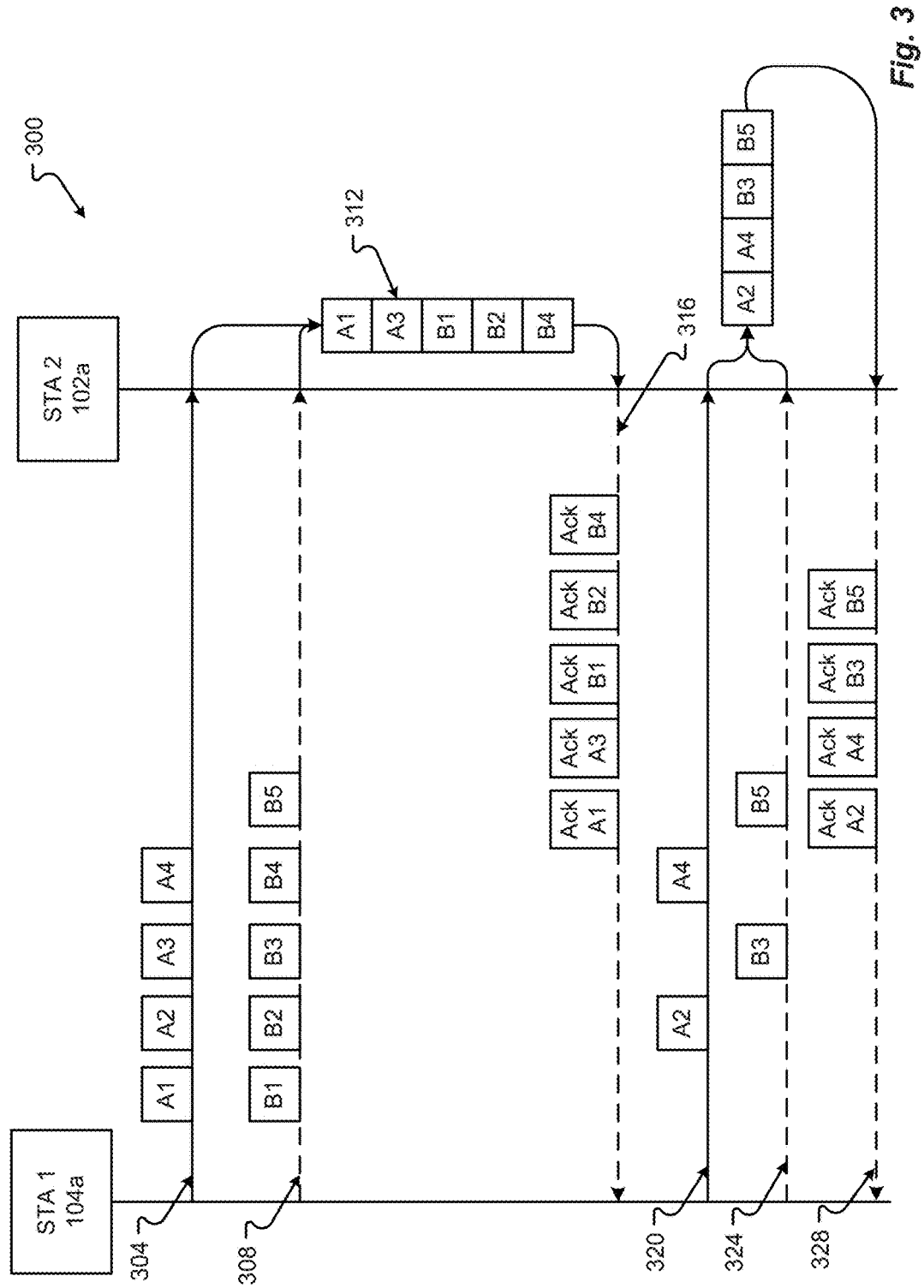
FIG. 3 illustrates an embodiment of a signalling procedure for conducting block acknowledgements for multi-band transmissions.

A signalling process 300 is shown in FIG. 3. In a first stage, the sending STA 104a separate packets arriving from higher layer and routes them into relevant band transmission entities (e.g., buffers 204). The traffic manager 208, in a second stage, transmits the data (signals 204, 208) through MAC and PHY components 212 to the receiving STA 102a on a first air interface 216a, as signal 304, and a second air interface 216b, as signal 308. In a third stage, the receiving STA 104a receives the packets on each of the air interfaces/bands 216a, 216b and can aggregate the data 312. Then, in a fourth stage, the acknowledgement manager 228 of the receiving STA 102a identifier the successfully received packets 312 and generates a common multi-band acknowledgment 316, which is sent as signal 220 to the sending STA 104a in the preferred operating band of the receiving STA 102a or of the sending STA 104a. In a fifth and final stage, the sending STA 104a retransmits packets that were not received at the receiving STA 102a, based on the multi-band acknowledgment 220. The retransmitted data 320 and/or 324 can be sent in either bands or in the band that was originally used to attempt the transmission. These retransmitted packets are the acked an signal 328

An embodiment of data structures 400 that can be used to report the acknowledgment status per TID for multi-band BA are shown in FIGS. 4A through 4E. Data structure 400 can reuse or change the current IEEE 802.11ax multi-STA BlockAck settings. First, information that is common to all bands can be provided in the BA control field 404, then the actual acknowledgment status per TID is indicated in the BA information field 408.

The current 11ax multi-STA BlockAck settings can be modified to enable provision of per band information, for example, the BA Control 404 field can be modified by adding Multi-band Common Information 428 field and the Per-TID Information 448 can be modified to support multi band by adding the Band Identifier (ID) 460, the AID 464, and TID information 468, 472, to provide the information to the receiver to which band the BA information relates.

Thus, the BA Control 404 (shown in FIG. 4A) can include the information shown in FIGS. 4B and 4C. For example, the BA Control 404 can include a BAR Ack Policy 412, a multi-TID 416, a compressed Bitmap 420, a GCR 424, the new multi-band common information 428 (described below), and/or TID information 432. The multi-band common information 428 can include common band information 436, a band list 440, and a band value 444. Most of the information in FIGS. 4A-4C is generally unchanged from what is currently used for multi-band transmissions and, as such, will not be described herein. The Common Band Information 436 provides information about the block ack that are common to each of the two or more bands. The band list 440 provides an identifier to identify the bands to which the A is to apply. The band value 444 provides a value or bit that indicates whether a BA for that band applies.

BA information 408 may be as shown in FIGS. 4A, 4D, and 4E. Here, the BA information 408 can include per-TID information 448, multi-TID information 452, and a block Ack Bitmap 456. Again, only the per-TID information 448 may extend to include the band indication, and the other data 452, 456 is generally unchanged and, as such, will not be described herein. The per-TID information 448 can include one or more of a band ID 460, an AID 464, a TID 468, and a TID Value 472. The band ID 460 can be any identifier that identifies the band used for the data packet that is unique compared to the other bands. Thus, the band ID 460 can be a numeric ID, an alphanumeric ID, globally unique identifier (GUID), or other type of identifier. For example, the data blocks sent in signal 304, in FIG. 3, have a band ID 460 of "A". In contrast, the data blocks sent in signal 308, in FIG. 3, have a band ID 460 of "B".

The AID 464 can be the ID associated with the STA that sends and/or receives the BA or other communications between the STAs 104a, 102a. The traffic identifier (TID) 468 may identify the communication to which the packet belongs. Thus, a set of packets sent to a STA 102a, 104a may have a particular TID 468 compared to another set of packets. The TID 468 for signal 304 may be different than signal 308. However, in other configurations the TID 468 for signal 304 may be the same as the signal 308 to allow the receiving STA 102a to aggregate or combine the received data from the different bands and understand a BA should be used for the combined data. The TID value 472 may have a similar function to the TID 468 to identify a packet in a stream of packets. These values can be returned for each data packet in a BA signal 316 to acknowledge receipt of a data packet in a multi-band transmission.

To advertise or indicate the ability to send multi-band BAs, the Add Block Acknowledgement (ADDBA) capabilities field 504, as shown in FIGS. 5A through 5C, can be changed to add or modify the BA scheme for multi-band transmissions. The BA request/response 500 may have some or all of the data shown in FIGS. 5A through 5C. However, some of the data may not be changed and will not be described hereinafter.

The ADDBA capabilities field 504, as shown in FIG. 5B, can include one or more of, but is not limited to, common band information 508, a band list 512, a BA method 516, BA characteristics 520, STA characteristics 524, priorities 528, and context switching information 532. The BA characteristics 520, as shown in FIG. 5C, may have new or modified fields to announce the changes in the BA procedure. Namely, the BA characteristics 520 can include one or more of, but is not limited to: a BA format 536, a multi-TID list 540, simultaneous bands information 544, aggregation limit 548, a delay limit 552, and/or a BA policy 556. The BA format 536 can define what structure the BA 316 will take. Thus, the BA format provides how the BA for multi-band transmissions will be presented in a single BA 316. In other words, the BA format 536 describes how the bands and the packets are acknowledged.

The multi-TID list provides how the TID 468, 472 is provided or how many TIDs are possible. The simultaneous bands 544 provides an indication of how many bands may be used for data exchange. Thus, this number is two or more. An aggregation limit 548 provides an indication of how many bands or data packets can be acknowledged in a BA 316. A delay limit 552 provides that maximum wait time that will be used before sending a BA. The delay limit 552 ensures that a sending STA 104a does not wait indefinitely for a BA but can determine when the BA failed to be received. Finally, the BA policy 556 can provide other information on how to conduct the multi-band BA.

Figure 6:
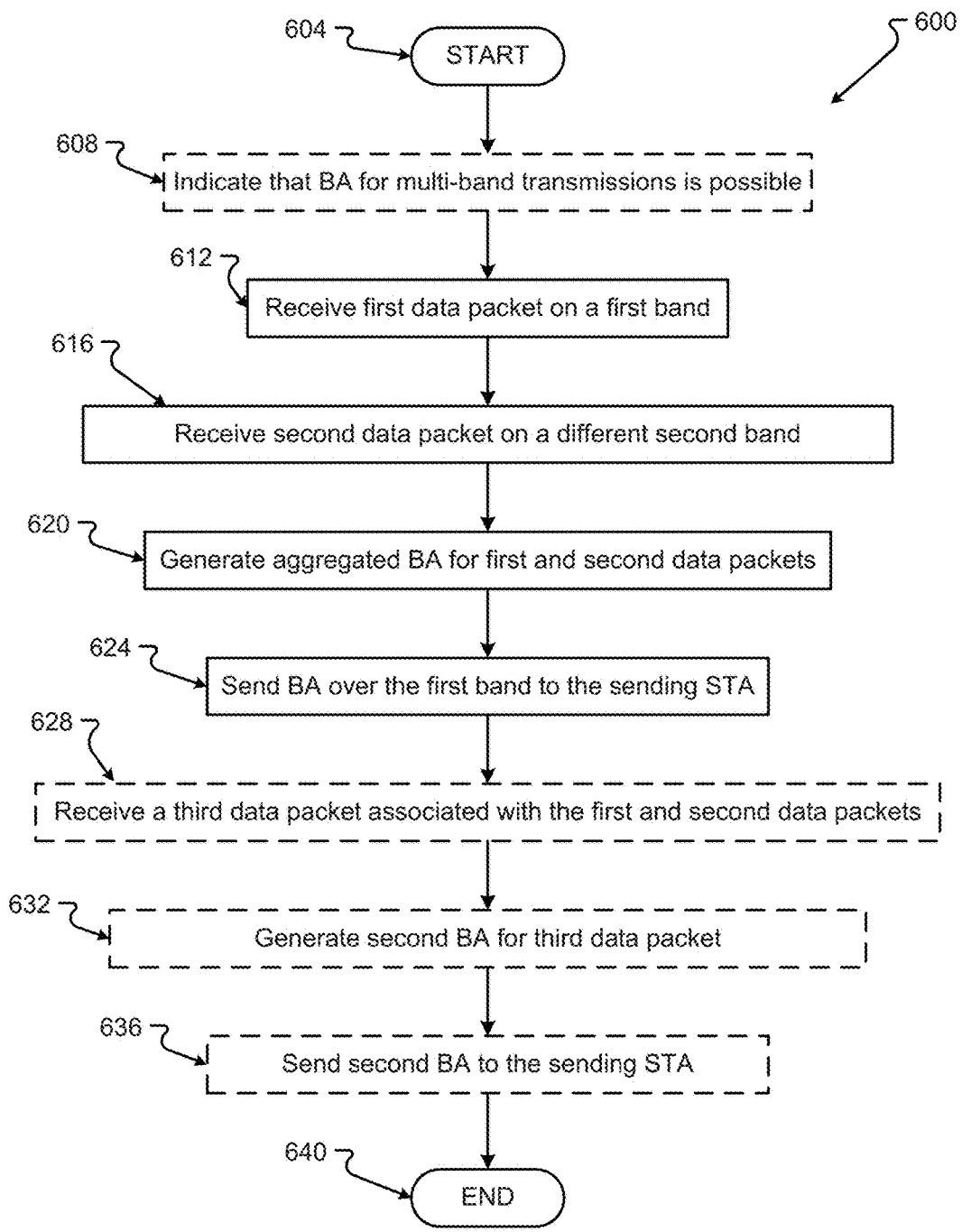
FIG. 6 is a flowchart outlining an exemplary technique for using a multi-band block acknowledgement.

The process 600, conducted by the AP 102a (receiving STA) and STA 104a (sending STA), for providing BA for a multi-band transmission may be as shown in FIG. 6. A general order for the steps of the method 600 is shown in FIG. 6. Generally, the method 600 starts with a start operation 604 and ends with operation 640. The method 600 can include more or fewer steps or can arrange the order of the steps differently than those shown in FIG. 6. The method 600 can be executed as a set of computer-executable instructions executed by a computer system or processor and encoded or stored on a computer readable medium. In other configurations, the method 600 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 600 shall be explained with reference to the systems, components, circuits, modules, software, data structures, signalling processes, etc. described in conjunction with FIGS. 1-5C and 8.

In optional step 608, the AP 102a (the receiving STA) can indicate that an aggregated BA is possible for multi-band transmissions. The ADDBA request 500 can be sent from the receiving STA 102a to the sending STA 104a. In another configuration, the sending STA 104a can send the ADDBA request 500. In response, an ADDBA response 500 can be sent back to the sending STA 104a from the receiving STA 102a. The ADDBA request/response 500 can indicate to or request the STA 104a/102a that the STA 104a/102 desires or can send a single BA for transmissions over multiple bands.

The receiving STA 102a can receive a first data packet on a first band, in step 612. Here, a recipient hardware 224a (e.g., receiver 868, MAC module 860, and/or PHY module 856, etc.) can receive a signal 304 over a first band 216a. The first data packet (e.g., "A1" in FIG. 3) can be sent to an acknowledgement manager 228 executed in a controller 820. Contemporary to receiving the first data packet, the receiving STA 102a receives a second data packet on a different second band, in step 616. The recipient hardware 224b (e.g., receiver 868, MAC module 860, and/or PHY module 856, etc.) can receive a signal 308 over a second band 216b. The second data packet (e.g., "B1" in FIG. 3) can be sent to the acknowledgement manager 228 executed in the controller 820.

The acknowledgement manager 228 can then aggregate the first, second, and/or other data packets 312, in a buffer 232, saved in memory 816. Based on the received data packets, the acknowledgement manager 228 can generate an aggregated BA for at least the first and second data packets, in step 620. The BA can contain some or all the data in data structure 400 shown in FIGS. 4A through 4E. The BA may then be sent to the transmitter hardware 224a (e.g., transmitter 864, MAC module 860, and/or PHY module 856, etc.).

The transmitter hardware 224a (e.g., transmitter 864, MAC module 860, and/or PHY module 856, etc.) can send the BA 400, as signal 316, over the first band 216a or the second band 216b (shown in FIG. 2 as signal 220) to the sending STA 104a, in step 624.

If a third data packet was sent from the sending STA 104a but not received by the receiving STA 102a, the receiving STA 102a can receive third data packet on a first band or a second band, in optional step 628. Here, a recipient hardware 224a (e.g., receiver 868, MAC module 860, and/or PHY module 856, etc.) can receive another signal 320/324 over a first band 216a or a second band 216b. The third data packet (e.g., "A2" in FIG. 3) can be sent to an acknowledgement manager 228 executed in a controller 820.

Optionally, the acknowledgement manager 228 can then aggregate the third data packet, in a buffer 232, saved in memory 816. Based on the received third data packet, the acknowledgement manager 228 can generate another aggregated BA for at least the third data packet, in optional step 632. The BA can contain some or all the data in data structure 400 shown in FIGS. 4A through 4E. The BA may then be sent to the transmitter hardware 224a (e.g., transmitter 864, MAC module 860, and/or PHY module 856, etc.). Then, in optional step 636, the transmitter hardware 224a (transmitter 864, MAC module 860, and/or PHY module 856) can send the BA 400, as signal 328, over the first band 216a or the second band 216b (shown in FIG. 2 as signal 220) to the sending STA 104a.

Figure 7:
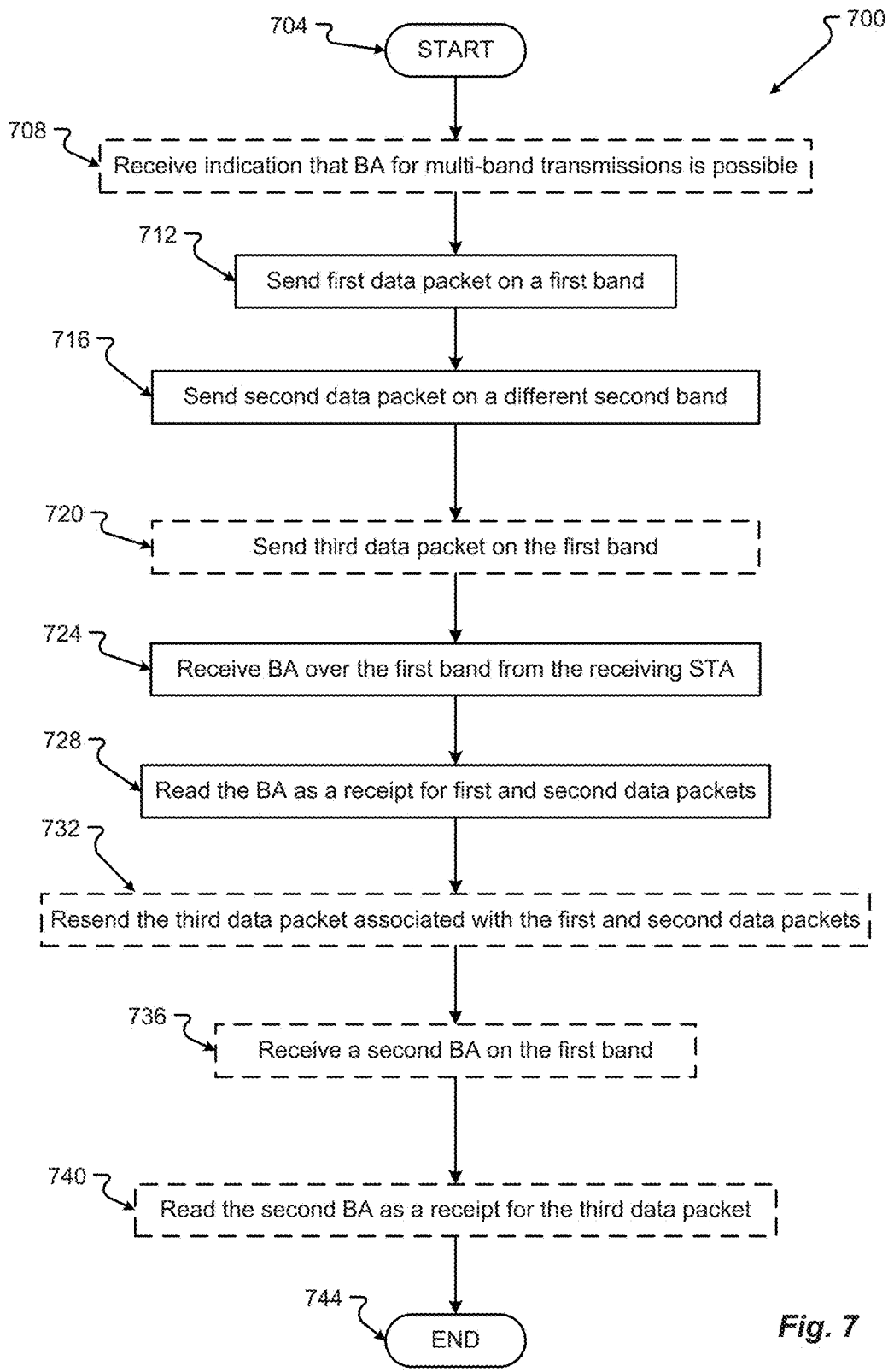
FIG. 7 is a flowchart outlining an exemplary technique for using a multi-band block acknowledgement.

Another process 700, conducted by the AP 102a (receiving STA) and STA 104a (sending STA), for providing BA for a multi-band transmission may be as shown in FIG. 7. A general order for the steps of the method 700 is shown in FIG. 7. Generally, the method 700 starts with a start operation 704 and ends with operation 744. The method 700 can include more or fewer steps or can arrange the order of the steps differently than those shown in FIG. 7. The method 700 can be executed as a set of computer-executable instructions executed by a computer system or processor and encoded or stored on a computer readable medium. In other configurations, the method 700 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 700 shall be explained with reference to the systems, components, circuits, modules, software, data structures, signalling processes, etc. described in conjunction with FIGS. 1-6 and 8.

In optional step 708, the sending STA 104a can receive, from the AP 102a (the receiving STA), an indication that an aggregated BA is possible for multi-band transmissions. The ADDBA request 500 can be sent from the receiving STA 102a to the sending STA 104a. In another configuration, the sending STA 104a can send the ADDBA request 500. In response, an ADDBA response 500 can be sent back to the sending STA 104a from the receiving STA 102a. The ADDBA request/response 500 can indicate to or request the STA 104a/102a that the STA 104a/102 desires or can send a single BA for transmissions over multiple bands.

The sending STA 104a can send a first data packet on a first band 216a, in step 712. Here, a transmitter hardware 212a (transmitter 864, MAC module 860, and/or PHY module 856) can send a signal 304 over a first band 216a. The first data packet (e.g., "A1" in FIG. 3) can be provided by a traffic manager 208, executed in a controller 820, and retrieved from a buffer 204a stored in memory 816. Contemporary to sending the first data packet, the sending STA 104a sends a second data packet on a different second band 216b, in step 716. The transmitter hardware 224b (e.g., transmitter 864, MAC module 860, and/or PHY module 856, etc.) can send a signal 308 over a second band 216b. The second data packet (e.g., "B1" in FIG. 3) can be provided by a traffic manager 208, executed in a controller 820, and retrieved from a buffer 204b stored in memory 816.

Also, contemporary to sending the first data packet and/or second data packet, the sending STA 104a sends a third data packet on a first band 216a and/or a second band 216b, in optional step 720. The transmitter hardware 224b (e.g., transmitter 864, MAC module 860, and/or PHY module 856, etc.) can send a signal 304/308 over a first band 216a or a second band 216b. The third data packet (e.g., "A2" in FIG. 3) can be provided by a traffic manager 208, executed in a controller 820, and retrieved from a buffer 204b or 204a stored in memory 816.

The receiver hardware 212a (receiver 868, MAC module 860, and/or PHY module 856) can receive the BA 400, as signal 316, over the first band 216a or the second band 216b (shown in FIG. 2 as signal 220) from the receiving STA 102a, in step 724. The BA 400 can then be sent to the traffic manager 208.

The traffic manager 208 can then read the BA 400 to determine if the first, second, and/or third data packets were received by the receiving STA 102a, in step 728. The BA can contain some or all the data in data structure 400 shown in FIGS. 4A through 4E. Thus, the traffic manager 208 can access per TID information 448 to match to information about the data packets previously sent. If a data packet with a TID 468 and/or TID value 472 is not shown in the BA information 408, the traffic manager 208 can determine that the data packet was not received by the receiving STA 102a.

If the third data packet was sent from the sending STA 104a but not received by the receiving STA 102a, the sending STA 104a can resend third data packet on a first band or a second band 216a, 216b, in optional step 732. Here, a transmitter hardware 224a (e.g., transmitter 864, MAC module 860, and/or PHY module 856, etc.) can resend the third data packet in another signal 320/324 over a first band 216a or a second band 216b. The third data packet (e.g., "A2" in FIG. 3) can be can be provided by a traffic manager 208, executed in a controller 820, and retrieved from a buffer 204a or 204a stored in memory 816.

The receiver hardware 212a (e.g., receiver 868, MAC module 860, and/or PHY module 856, etc.) can receive a second BA 400, as signal 328, over the first band 216a or the second band 216b (shown in FIG. 2 as signal 220) from the receiving STA 102a, in optional step 736. The BA 400 can then be sent to the traffic manager 208.

The traffic manager 208 can then read the second BA 400 to determine if the third data packet was received by the receiving STA 102a, in optional step 740. The second BA can contain some or all the data in data structure 400 shown in FIGS. 4A through 4E. Thus, the traffic manager 208 can access per TID information 448 to match to information about the third data packet previously sent. If the third data packet with a TID 468 and/or TID value 472 is not shown in the BA information 408, the traffic manager 208 can determine that the third data packet was not received by the receiving STA 102a. If the third data packet with a TID 468 and/or TID value 472 is shown in the BA information 408, the traffic manager 208 can determine that the data packet was received by the receiving STA 102a.

Figure 8:
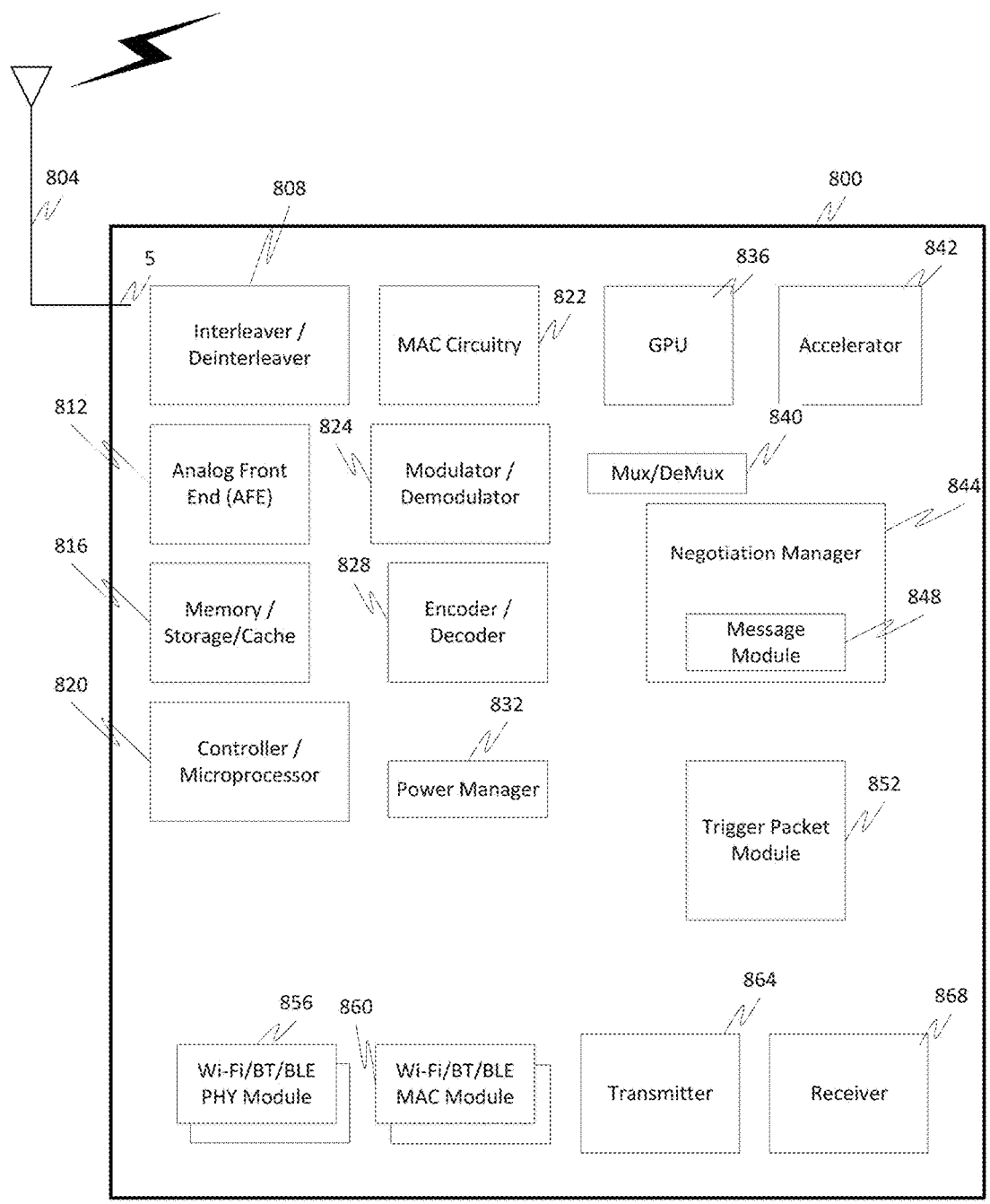
FIG. 8 is an illustration of the hardware/software associated with a STA and/or AP.

FIG. 8 illustrates an exemplary hardware diagram of a device 800, such as a wireless device, mobile device, access point, station, and/or the like, that is adapted to implement the technique(s) discussed herein. Operation will be discussed in relation to the components in FIG. 8 appreciating that each separate device in a system, e.g., station, AP, proxy server, etc., can include one or more of the components shown in the figure, with the components each being optional.

In addition to well-known componentry (which has been omitted for clarity), the device 800 includes interconnected elements (with links 5 omitted for clarity) including one or more of: one or more antennas 804, an interleaver/deinterleaver 808, an analog front end (AFE) 812, memory/storage/cache 816, controller/microprocessor 820, MAC circuitry 822, modulator/demodulator 824, encoder/decoder 828, power manager 832, GPU 836, accelerator 842, a multiplexer/demultiplexer 840, a negotiation manager 844, message module 848, trigger packet module 852, and wireless radio components such as a Wi-Fi/BT/BLE PHY module 856, a Wi-Fi/BT/BLE MAC module 860, transmitter 864 and receiver 868. The various elements in the device 800 are connected by one or more links (not shown, again for sake of clarity). As one example, the negotiation manager 844 and message module 848 can be embodied as a process executing on a processor or controller, such as processor 820 with the cooperation of the memory 816. The negotiation manager 844 and message module 848 could also be embodied as an ASIC and/or as part of a system on a chip. In some configurations, there can be multiple instances of the PHY Module/Circuitry 856, MAC circuitry 822, transmitter 864, and/or receiver 868, wherein each instance of the PHY Module/Circuitry 856, MAC circuitry 822, transmitter 864, and/or receiver 868 sends/receives data over a specific band (e.g., 2.45 GHz, 915 MHz, 5.2 GHz, etc.) to facilitate multi-band transmissions.

The device 800 can have one more antennas 804, for use in wireless communications such as multi-input multi-output (MIMO) communications, multi-user multi-input multi-output (MU-MIMO) communications Bluetooth®, LTE, RFID, 4G, LTE, etc. The antenna(s) 804 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users.

Antenna(s) 804 generally interact with the Analog Front End (AFE) 812, which is needed to enable the correct processing of the received modulated signal and signal conditioning for a transmitted signal. The AFE 812 can be functionally located between the antenna and a digital baseband system to convert the analog signal into a digital signal for processing and vice-versa.

The device 800 can also include a controller/microprocessor 820 and a memory/storage/cache 816. The device 800 can interact with the memory/storage/cache 816 which may store information and operations necessary for configuring and transmitting or receiving the information described herein. The memory/storage/cache 816 may also be used in connection with the execution of application programming or instructions by the controller/microprocessor 820, and for temporary or long term storage of program instructions and/or data. As examples, the memory/storage/cache 820 may comprise a computer-readable device, RAM, ROM, DRAM, SDRAM, and/or other storage device(s) and media.

The controller/microprocessor 820 may comprise a general purpose programmable processor or controller for executing application programming or instructions related to the device 800. Furthermore, the controller/microprocessor 820 can perform operations for configuring and transmitting information as described herein. The controller/microprocessor 820 may include multiple processor cores, and/or implement multiple virtual processors. Optionally, the controller/microprocessor 820 may include multiple physical processors. By way of example, the controller/microprocessor 820 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The device 800 can further include a transmitter 864 and receiver 868 which can transmit and receive signals, respectively, to and from other wireless devices and/or access points using the one or more antennas 804. Included in the device 800 circuitry is the medium access control or MAC Circuitry 822. MAC circuitry 822 provides for controlling access to the wireless medium. In an exemplary embodiment, the MAC circuitry 822 may be arranged to contend for the wireless medium and configure frames or packets for communicating over the wireless medium.

The PHY Module/Circuitry 856 controls the electrical and physical specifications for device 800. In particular, PHY Module/Circuitry 856 manages the relationship between the device 800 and a transmission medium. Primary functions and services performed by the physical layer, and in particular the PHY Module/Circuitry 856, include the establishment and termination of a connection to a communications medium, and participation in the various process and technologies where communication resources shared between, for example, among multiple STAs. These technologies further include, for example, contention resolution and flow control and modulation or conversion between a representation digital data in user equipment and the corresponding signals transmitted over the communications channel. These are signals are transmitted over the physical cabling (such as copper and optical fiber) and/or over a radio communications (wireless) link. The physical layer of the OSI model and the PHY Module/Circuitry 856 can be embodied as a plurality of sub components. These sub components or circuits can include a Physical Layer Convergence Procedure (PLCP) which acts as an adaption layer. The PLCP is at least responsible for the Clear Channel Assessment (CCA) and building packets for different physical layer technologies. The Physical Medium Dependent (PMD) layer specifies modulation and coding techniques used by the device and a PHY management layer manages channel tuning and the like. A station management sub layer and the MAC circuitry 822 handle co-ordination of interactions between the MAC and PHY layers.

The interleaver/deinterleaver 808 cooperates with the various PHY components to provide Forward Error correction capabilities. The modulator/demodulator 824 similarly cooperates with the various PHY components to perform modulation which in general is a process of varying one or more properties of a periodic waveform, referred to and known as a carrier signal, with a modulating signal that typically contains information for transmission. The encoder/decoder 828 manages the encoding/decoding used with the various transmission and reception elements in device 800.

The MAC layer and components, and in particular the MAC module 860 and MAC circuitry 822 provide functional and procedural means to transfer data between network entities and to detect and possibly correct errors that may occur in the physical layer. The MAC module 860 and MAC circuitry 822 also provide access to contention-based and contention-free traffic on different types of physical layers, such as when multiple communications technologies are incorporated into the device 800. In the MAC layer, the responsibilities are divided into the MAC sub-layer and the MAC management sub-layer. The MAC sub-layer defines access mechanisms and packet formats while the MAC management sub-layer defines power management, security and roaming services, etc.

The device 800 can also optionally contain a security module (not shown). This security module can contain information regarding but not limited to, security parameters required to connect the device to an access point or other device or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with the access point and/or another device. The information exchange can occur through encoded messages with the WEP access code often being chosen by the network administrator. WPA is an added security standard that is also used in conjunction with network connectivity with stronger encryption than WEP.

The accelerator 842 can cooperate with MAC circuitry 822 to, for example, perform real-time MAC functions. The GPU 836 can be a specialized electronic circuit designed to rapidly manipulate and alter memory to accelerate the creation of data such as images in a frame buffer. GPUs are typically used in embedded systems, mobile phones, personal computers, workstations, and game consoles. GPUs are very efficient at manipulating computer graphics and image processing, and their highly parallel structure makes them more efficient than general-purpose CPUs for algorithms where the processing of large blocks of data is done in parallel.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments are described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to enhanced GFDM communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:

A wireless communications device comprising: a wireless radio, associated with a first station (STA), to: receive first data packet on a first band from a second STA; receive second data packet on a second band from the second STA; and send a block acknowledgement (BA), which acknowledges receipt of both the first data packet and the second data packet, to the second STA over the first band.

Any of the one or more above aspects, wherein the wireless radio includes a first wireless radio associated with the first band and a second wireless radio associated with the second band.

Any of the one or more above aspects, further comprising a controller, in communication with the wireless radio, to:
  receive the first and second data packet;
  generate the BA that acknowledges receipt of the first and second data packets; and
  send the BA to the wireless radio.

Any of the one or more above aspects, wherein a second wireless receiver of the second STA transmits the first data packet on the first band to the first, transmits the second data packet on the second band to the first STA, transmits a third data packet to the first STA on the first band, receives the BA from the first STA over the first band, and re-transmits the third data packet based on the received BA.

Any of the one or more above aspects, wherein the wireless radio to receive the third data packet on the first band, wherein the third data packet is received after the BA was sent to the second STA.

Any of the one or more above aspects, wherein the third data packet was not received when originally sent with the first and second data packets.

Any of the one or more above aspects, wherein the controller further to compile a second BA for the third data packet.

Any of the one or more above aspects, wherein the BA includes one or more of a per-traffic identifier (TID) information, multi-TID information, and/or a BA bitmap.

Any of the one or more above aspects, wherein the per-TID information includes one or more of a band index, an associate identifier (AID), a TID, and/or a TID Value.

Any of the one or more above aspects, wherein the controller to further send an indication to the second STA that the first STA can provide BAs for multi-band transmissions, wherein the indication comprises one or more of a BA format, a multi-TID list, simultaneous bands information, an aggregation limit, a delay limit, and/or a BA policy.

A method comprising:
  receiving first data packet on a first band from a second STA;
  receiving second data packet on a second band from the second STA; and
  sending a block acknowledgement (BA), which acknowledges receipt of both the first data packet and the second data packet, to the second STA over the first band.

Any of the one or more above aspects, wherein the wireless radio includes a first wireless radio associated with the first band and a second wireless radio associated with the second band.

Any of the one or more above aspects, further comprising:
  receiving the first and second data packet;
  generating the BA that acknowledges receipt of the first and second data packets; and
  sending the BA to the wireless radio.

Any of the one or more above aspects, wherein a second wireless receiver of the second STA transmits the first data packet on the first band to the first, transmits the second data packet on the second band to the first STA, transmits a third data packet to the first STA on the first band, receives the BA from the first STA over the first band, and re-transmits the third data packet based on the received BA.

Any of the one or more above aspects, wherein the wireless radio to receive the third data packet on the first band, wherein the third data packet is received after the BA was sent to the second STA.

Any of the one or more above aspects, wherein the third data packet was not received when originally sent with the first and second data packets.

Any of the one or more above aspects, wherein the controller further to compile a second BA for the third data packet.

Any of the one or more above aspects, wherein the BA includes one or more of a per-traffic identifier (TID) information, multi-TID information, and/or a BA bitmap.

Any of the one or more above aspects, wherein the per-TID information includes one or more of a band index, an associate identifier (AID), a TID, and/or a TID Value.

Any of the one or more above aspects, wherein the controller to further send an indication to the second STA that the first STA can provide BAs for multi-band transmissions, wherein the indication comprises one or more of a BA format, a multi-TID list, simultaneous bands information, an aggregation limit, a delay limit, and/or a BA policy.

A non-transitory information storage media having stored thereon one or more instructions, that when executed by one or more processors, cause a wireless communications device to perform a method, the method comprising:
 receiving first data packet on a first band from a second STA;
 receiving second data packet on a second band from the second STA; and
 sending a block acknowledgement (BA), which acknowledges receipt of both the first data packet and the second data packet, to the second STA over the first band.

Any of the one or more above aspects, wherein the wireless radio includes a first wireless radio associated with the first band and a second wireless radio associated with the second band.

Any of the one or more above aspects, the method further comprising:
 receiving the first and second data packet;
 generating the BA that acknowledges receipt of the first and second data packets; and
 sending the BA to the wireless radio.

Any of the one or more above aspects, wherein a second wireless receiver of the second STA transmits the first data packet on the first band to the first, transmits the second data packet on the second band to the first STA, transmits a third data packet to the first STA on the first band, receives the BA from the first STA over the first band, and re-transmits the third data packet based on the received BA.

Any of the one or more above aspects, wherein the wireless radio to receive the third data packet on the first band, wherein the third data packet is received after the BA was sent to the second STA.

Any of the one or more above aspects, wherein the third data packet was not received when originally sent with the first and second data packets.

Any of the one or more above aspects, wherein the controller further to compile a second BA for the third data packet.

Any of the one or more above aspects, wherein the BA includes one or more of a per-traffic identifier (TID) information, multi-TID information, and/or a BA bitmap.

Any of the one or more above aspects, wherein the per-TID information includes one or more of a band index, an associate identifier (AID), a TID, and/or a TID Value.

Any of the one or more above aspects, wherein the controller to further send an indication to the second STA that the first STA can provide BAs for multi-band transmissions, wherein the indication comprises one or more of a BA format, a multi-TID list, simultaneous bands information, an aggregation limit, a delay limit, and/or a BA policy.

A wireless communications device comprising:
 means for receiving first data packet on a first band from a second STA;
 means for receiving second data packet on a second band from the second STA; and
 means for sending a block acknowledgement (BA), which acknowledges receipt of both the first data packet and the second data packet, to the second STA over the first band.

Any of the one or more above aspects, wherein the wireless radio includes a first wireless radio associated with the first band and a second wireless radio associated with the second band.

Any of the one or more above aspects, further comprising:
 means for receiving the first and second data packet;
 means for generating the BA that acknowledges receipt of the first and second data packets; and
 means for sending the BA to the wireless radio.

Any of the one or more above aspects, wherein a second wireless receiver of the second STA transmits the first data packet on the first band to the first, transmits the second data packet on the second band to the first STA, transmits a third data packet to the first STA on the first band, receives the BA from the first STA over the first band, and re-transmits the third data packet based on the received BA.

Any of the one or more above aspects, wherein the wireless radio to receive the third data packet on the first band, wherein the third data packet is received after the BA was sent to the second STA.

Any of the one or more above aspects, wherein the third data packet was not received when originally sent with the first and second data packets.

Any of the one or more above aspects, wherein the controller further to compile a second BA for the third data packet.

Any of the one or more above aspects, wherein the BA includes one or more of a per-traffic identifier (TID) information, multi-TID information, and/or a BA bitmap.

Any of the one or more above aspects, wherein the per-TID information includes one or more of a band index, an associate identifier (AID), a TID, and/or a TID Value.

Any of the one or more above aspects, wherein the controller to further send an indication to the second STA that the first STA can provide BAs for multi-band transmissions, wherein the indication comprises one or more of a BA format, a multi-TID list, simultaneous bands information, an aggregation limit, a delay limit, and/or a BA policy.

A wireless communications device comprising:
 a wireless radio, associated with a first station (STA), to:
  send first data packet on a first band to a second STA;
  send second data packet on a second band to the second STA;
  receive a block acknowledgement (BA) from the second STA over the first band;
 a controller, in communication with the wireless radio, to:
  compile the first and second data packet;

receive the BA from the wireless radio; and read the BA that acknowledges receipt of the first and second data packets.

Any of the one or more above aspects, wherein the wireless radio includes a first wireless radio associated with the first band and a second wireless radio associated with the second band.

Any of the one or more above aspects, wherein the first band and second band are different.

Any of the one or more above aspects, wherein the wireless radio to send a third data packet on the first band, wherein the BA indicates that the third data packet is not received at the second STA.

Any of the one or more above aspects, wherein the wireless radio to resend the third data packet to the second STA on the first band.

Any of the one or more above aspects, wherein the controller further to receive a second BA for the third data packet.

Any of the one or more above aspects, wherein the BA includes one or more of a per-traffic identifier (TID) information, multi-TID information, and/or a BA bitmap.

Any of the one or more above aspects, wherein the per-TID information includes one or more of a band index, an associate identifier (AID), a TID, and/or a TID Value.

Any of the one or more above aspects, the controller to further receive an indication from the second STA that the second STA can provide BAs for multi-band transmissions.

Any of the one or more above aspects, wherein the indication comprises one or more of a BA format, a multi-TID list, simultaneous bands information, an aggregation limit, a delay limit, and/or a BA policy.

A method comprising:

a wireless radio sending first data packet on a first band to a second STA;

the wireless radio sending second data packet on a second band to the second STA; and the wireless radio receiving a block acknowledgement (BA) from the second STA over the first band, wherein the BA acknowledges receipt of the first and second data packets.

Any of the one or more above aspects, wherein the wireless radio includes a first wireless radio associated with the first band and a second wireless radio associated with the second band.

Any of the one or more above aspects, wherein the first band and second band are different.

Any of the one or more above aspects, wherein the wireless radio to send a third data packet on the first band, wherein the BA indicates that the third data packet is not received at the second STA.

Any of the one or more above aspects, wherein the wireless radio to resend the third data packet to the second STA on the first band.

Any of the one or more above aspects, wherein a controller to receive a second BA for the third data packet.

Any of the one or more above aspects, wherein the BA includes one or more of a per-traffic identifier (TID) information, multi-TID information, and/or a BA bitmap.

Any of the one or more above aspects, wherein the per-TID information includes one or more of a band index, an associate identifier (AID), a TID, and/or a TID Value.

Any of the one or more above aspects, the controller receives an indication from the second STA that the second STA can provide BAs for multi-band transmissions.

Any of the one or more above aspects, wherein the indication comprises one or more of a BA format, a multi-TID list, simultaneous bands information, an aggregation limit, a delay limit, and/or a BA policy.

A non-transitory information storage media having stored thereon one or more instructions, that when executed by one or more processors, cause a wireless communications device to perform a method, the method comprising:

a wireless radio sending first data packet on a first band to a second STA;

the wireless radio sending second data packet on a second band to the second STA; and the wireless radio receiving a block acknowledgement (BA) from the second STA over the first band, wherein the BA acknowledges receipt of the first and second data packets.

Any of the one or more above aspects, wherein the wireless radio includes a first wireless radio associated with the first band and a second wireless radio associated with the second band.

Any of the one or more above aspects, wherein the first band and second band are different.

Any of the one or more above aspects, wherein the wireless radio to send a third data packet on the first band, wherein the BA indicates that the third data packet is not received at the second STA.

Any of the one or more above aspects, wherein the wireless radio to resend the third data packet to the second STA on the first band.

Any of the one or more above aspects, wherein a controller to receive a second BA for the third data packet.

Any of the one or more above aspects, wherein the BA includes one or more of a per-traffic identifier (TID) information, multi-TID information, and/or a BA bitmap.

Any of the one or more above aspects, wherein the per-TID information includes one or more of a band index, an associate identifier (AID), a TID, and/or a TID Value.

Any of the one or more above aspects, wherein the controller receives an indication from the second STA that the second STA can provide BAs for multi-band transmissions.

Any of the one or more above aspects, wherein the indication comprises one or more of a BA format, a multi-TID list, simultaneous bands information, an aggregation limit, a delay limit, and/or a BA policy.

A wireless communications device comprising:

means for sending first data packet on a first band to a second STA;

means for sending second data packet on a second band to the second STA; and means for receiving a block acknowledgement (BA) from the second STA over the first band, wherein the BA acknowledges receipt of the first and second data packets.

Any of the one or more above aspects, wherein the means for receiving includes a first wireless radio associated with the first band and a second wireless radio associated with the second band.

Any of the one or more above aspects, wherein the first band and second band are different.

Any of the one or more above aspects, further comprising means for sending a third data packet on the first band, wherein the BA indicates that the third data packet is not received at the second STA.

Any of the one or more above aspects, further comprising means for resending the third data packet to the second STA on the first band.

Any of the one or more above aspects, further comprising means for receiving a second BA for the third data packet.

Any of the one or more above aspects, wherein the BA includes one or more of a per-traffic identifier (TID) information, multi-TID information, and/or a BA bitmap.

Any of the one or more above aspects, wherein the per-TID information includes one or more of a band index, an associate identifier (AID), a TID, and/or a TID Value.

Any of the one or more above aspects, further comprising means for receiving an indication from the second STA that the second STA can provide BAs for multi-band transmissions.

Any of the one or more above aspects, wherein the indication comprises one or more of a BA format, a multi-TID list, simultaneous bands information, an aggregation limit, a delay limit, and/or a BA policy.

A system on a chip (SoC) including any one or more of the above aspects.

One or more means for performing any one or more of the above aspects.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhanced communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless communications device comprising:
a wireless radio, associated with a first station (STA), to:
receive first data packet on a first band from a second STA;
receive second data packet on a second band from the second STA; and
send a block acknowledgement (BA), which acknowledges receipt of both the first data packet and the second data packet, to the second STA over the first band.

2. The wireless communications device of claim 1, wherein the wireless radio includes a first wireless radio associated with the first band and a second wireless radio associated with the second band.

3. The wireless communications device of claim 2, further comprising a controller, in communication with the wireless radio, to:
receive the first and second data packet;
generate the BA that acknowledges receipt of the first and second data packets; and
send the BA to the wireless radio.

4. The wireless communications device of claim 2, wherein a second wireless receiver of the second STA transmits the first data packet on the first band to the first, transmits the second data packet on the second band to the first STA, transmits a third data packet to the first STA on the first band, receives the BA from the first STA over the first band, and re-transmits the third data packet based on the received BA.

5. The wireless communications device of claim 4, wherein the wireless radio to receive the third data packet on the first band, wherein the third data packet is received after the BA was sent to the second STA.

6. The wireless communications device of claim 5, wherein the third data packet was not received when originally sent with the first and second data packets.

7. The wireless communications device of claim 6, wherein the controller further to compile a second BA for the third data packet.

8. The wireless communications device of claim 7, wherein the BA includes one or more of a per-traffic identifier (TID) information, multi-TID information, and/or a BA bitmap.

9. The wireless communications device of claim 8, wherein the per-TID information includes one or more of a band index, an associate identifier (AID), a TID, and/or a TID Value.

10. The wireless communications device of claim 9, wherein the controller to further send an indication to the second STA that the first STA can provide BAs for multi-band transmissions, wherein the indication comprises one or more of a BA format, a multi-TID list, simultaneous bands information, an aggregation limit, a delay limit, and/or a BA policy.

11. A method for conducting multi-band transmissions comprising:
a wireless radio of a first station (STA) associating with a second STA;
the wireless radio receiving a first data packet on a first band from the second STA;
the wireless radio receiving a second data packet on a second band from the second STA; and
the wireless radio sending a block acknowledgement (BA), which acknowledges receipt of the first and second data packets, to the second STA over the first band.

12. The method of claim 11, wherein a second wireless receiver of the second STA transmits the first data packet on the first band to the first, transmits the second data packet on the second band to the first STA, transmits a third data packet to the first STA on the first band, receives the BA from the first STA over the first band, and re-transmits the third data packet based on the received BA.

13. The method of claim 11, further comprising: the wireless radio receiving the third data packet on the first band, wherein the third data packet is received after the BA was sent to the second STA, wherein the third data packet was not received when originally sent with the first and second data packets.

14. The method of claim 13, further comprising the controller compiling a second BA for the third data packet.

15. The method of claim 11, wherein the BA includes one or more of a per-traffic identifier (TID) information, multi-TID information, and/or a BA bitmap, and wherein the per-TID information includes one or more of a band index, an associate identifier (AID), a TID, and/or a TID Value.

16. A non-transitory information storage media having stored thereon one or more instructions, that when executed by one or more processors, cause a receiving first station (STA) to perform a method, the method comprising:
associating with a second STA;
receiving a first data packet on a first band from the second STA;
receiving a second data packet on a second band from the second STA;
generating a block acknowledgement (BA) that acknowledges receipt of the first and second data packets; and
sending the BA to the second STA over the first band.

17. The media of claim 16, wherein the receiving STA includes a first wireless radio associated with the first band and a second wireless radio associated with the second band, wherein the first band and second band are different.

18. The media of claim 17, the method further comprising receiving a third data packet on the first band, wherein the third data packet is received after the BA was sent to the second STA, wherein the third data packet was not received when originally sent with the first and second data packets.

19. The media of claim 18, the method further comprising compiling a second BA for the third data packet.

20. The media of claim 19, wherein the BA includes one or more of a per-traffic identifier (TID) information, multi-TID information, and/or a BA bitmap, and wherein the per-TID information includes one or more of a band index, an associate identifier (AID), a TID, and/or a TID Value.

* * * * *